US008843151B2

(12) United States Patent
Wei et al.

(10) Patent No.: US 8,843,151 B2
(45) Date of Patent: Sep. 23, 2014

(54) SYSTEMS AND METHODS FOR PROVIDING DATA COMMUNICATIONS WITH BURST TRANSMISSIONS

(75) Inventors: Hung-Yu Wei, Taipei (TW); Ching-Chun Chou, Taipei (TW)

(73) Assignees: Industrial Technology Research Institute, Chutung, Hsinchu (TW); National Taiwan University, Taipei (TW)

(*) Notice: Subject to any disclaimer, the term of this patent is extended or adjusted under 35 U.S.C. 154(b) by 932 days.

(21) Appl. No.: 12/556,868

(22) Filed: Sep. 10, 2009

(65) Prior Publication Data

US 2010/0069083 A1 Mar. 18, 2010

Related U.S. Application Data

(60) Provisional application No. 61/096,085, filed on Sep. 11, 2008.

(51) Int. Cl.
*H04W 72/00* (2009.01)
*H04W 72/08* (2009.01)

(52) U.S. Cl.
CPC .............. *H04W 72/085* (2013.01); *Y02B 60/50* (2013.01)
USPC .......................... 455/452.2; 370/311; 370/346

(58) Field of Classification Search
USPC ................ 455/450–452.2, 574, 343.1–343.3, 455/450–455, 509–516; 370/311, 345–350, 370/458–461; 340/7.32–7.38; 574/327
See application file for complete search history.

(56) References Cited

U.S. PATENT DOCUMENTS

| | | | |
|---|---|---|---|
| 2002/0068577 A1* | 6/2002 | Balogh et al. | 455/452 |
| 2005/0141449 A1* | 6/2005 | Yuang et al. | 370/329 |
| 2007/0161364 A1* | 7/2007 | Surineni et al. | 455/343.4 |
| 2008/0063106 A1* | 3/2008 | Hahm et al. | 375/267 |
| 2008/0075027 A1 | 3/2008 | Lee et al. | |
| 2008/0095091 A1* | 4/2008 | Surineni et al. | 370/311 |
| 2008/0123574 A1* | 5/2008 | Sandhu et al. | 370/311 |
| 2008/0139133 A1 | 6/2008 | Usuda et al. | |
| 2008/0188222 A1* | 8/2008 | Oh | 455/436 |
| 2008/0247468 A1 | 10/2008 | Perez de Notario | |
| 2010/0008347 A1* | 1/2010 | Qin et al. | 370/345 |

OTHER PUBLICATIONS

Wang, Jianfeng, et al., "Opportunistic Packet Scheduling and Media Access Control for Wireless LANs and Multi-hop Ad Hoc Networks", IEEE Communications Society WCNC 2004.*
Lee, Jeongjoon, et al., "An opportunistic power-saving mode and scheduler design for wireless local area networks", IEEE Communications Society WCNC 2006 Proceedings.

* cited by examiner

*Primary Examiner* — George Eng
*Assistant Examiner* — Marcus Hammonds
(74) *Attorney, Agent, or Firm* — Finnegan, Henderson, Farabow, Garrett & Dunner, LLP

(57) ABSTRACT

Burst quality of service (QoS) mode uses a higher modulation rate and coding scheme for transmitting data blocks in a short period of time between a transmitting terminal and a user terminal experiencing a channel state above a certain threshold in a wireless communication system. Burst QoS may reduce data transmission time, thereby achieving a higher level of channel efficiency as well as a reduction in the consumption of power. In burst QoS mode, the channel state information (CSI) may be repeatedly measured. When the CSI is above a certain threshold, a higher rate modulation and coding (MC) scheme is used for burst data transmission. After the burst, a short sleep is triggered to reduce power consumption.

24 Claims, 4 Drawing Sheets

SYSTEMS AND METHODS FOR PROVIDING DATA COMMUNICATIONS WITH BURST TRANSMISSIONS

RELATED APPLICATIONS

This applications claims the benefit of priority from U.S. Provisional Patent Application No. 61/096,085, filed Sep. 11, 2008, the entire contents of which are hereby incorporated by reference.

TECHNICAL FIELD

This disclosure relates generally to systems and methods for data communications, and relates more specifically to systems and methods for providing data communications with burst transmissions.

BACKGROUND

Due to an increasing number of wireless devices and a growing demand for wireless services, wireless communication systems continue to expand and its applications continue to grow. To meet the growing demand, and to increase interoperability and reduce costs, various sets of standards have been introduced for wireless communications. As an example, one them is Institute of Electrical and Electronics Engineers, Inc. ("IEEE") 802. IEEE 802 includes a family of standards applicable to local area networks ("LAN") and metropolitan area networks ("MAN"). Within IEEE 802, IEEE 802.16 includes a series of wireless broadband standards, commonly referred to as WiMAX™.

The transmission of data, which may include voice, images, video, messages, and other forms of data, in a wireless communication system may be affected by channel conditions, which may vary over time. Good channel conditions may allow a higher rate of modulation and coding, resulting in faster data transmission. In contrast, poor channel conditions can only provide slower data transmission. In many applications, poor channel conditions may require more robust modulation and coding to compensate for a higher likelihood of transmission errors, resulting in additional signaling cost and/or further reduced data transmission rate.

Various factors may constrain the data transmission of wireless communication system. For example, because there are a limited number of wireless channels to serve multiple user terminals, such as mobile stations ("MSs"), radio resource allocation may constrain how or when a mobile station or transmitting terminal, such as a base station ("BS"), can transmit or receive data. Another example is the limited power of MSs, which typically operates on battery power. Power consumption therefore may constrain how or when the MS can transmit or receive data.

One proposal for addressing some of these system constraints include employing a power-saving mode, which gives wireless nodes with better channel conditions priority to transmit data. For example, Lee, J.; Rosenberg, C.; Chong, and E. K. P. discussed the idea in an article titled "An opportunistic power-saving mode and scheduler design for wireless local area networks," *Wireless Communications and Networking Conference*, 2006. *IEEE*, vol. 2, pp. 926-33. However, the use of power-saving mode or other implementations may vary depending on factors such as system applications, system design, user demand, and type of data transmitted.

Therefore, it may be desirable to have systems or methods that provide data communications and can, in some applications, overcome one or more of the problems discussed above.

SUMMARY

In one exemplary embodiment, the present disclosure is directed to a method for wireless communication including: establishing a communication channel between a first terminal and a second terminal, the communication channel being configured to provide wireless communications of more than two terminals; transmitting over the communication channel at least one reference signal from a first terminal to a second terminal within a first time period, each reference signal being transmitted at a corresponding interval within the first time period and being configured to allow evaluation of a channel condition of the communication channel based on the at least one reference signal; and receiving a responsive signal from the second terminal, the responsive signal being transmitted when a channel condition estimation of the communication channel exceeds a channel condition threshold, the responsive signal being indicative of the second terminal being ready for a data transmission.

In another exemplary embodiment, the present disclosure is directed to a computer-readable medium including instructions for performing a method including: establishing a communication channel between a first terminal and a second terminal, the communication channel being configured to provide wireless communications of more than two terminals; transmitting over the communication channel at least one reference signal from a first terminal to a second terminal within a first time period, each reference signal being transmitted at a corresponding interval within the first time period and being configured to allow evaluation of a channel condition of the communication channel based on the at least one reference signal; and receiving a responsive signal from the second terminal, the responsive signal being transmitted when a channel condition estimation of the communication channel exceeds a channel condition threshold, the responsive signal being indicative of the second terminal being ready for a data transmission.

In another exemplary embodiment, the present disclosure is directed to a wireless communication method including: monitoring a communication channel between a first terminal and a second terminal, the communication channel being configured to provide wireless communications of more than two terminals; receiving over the communication channel at least one reference signal from a first terminal to a second terminal within a first time period, each reference signal being transmitted at a corresponding interval within the first time period and being configured to allow evaluation of a channel condition of the communication channel based on the at least one reference signal; and transmitting a responsive signal from the second terminal, the responsive signal being transmitted when a channel condition estimation of the communication channel exceeds a channel-condition threshold, the responsive signal being indicative of the second terminal being ready for a data transmission.

In another exemplary embodiment, the present disclosure is directed to a wireless communication system including: a first terminal, configured to receive at least one reference signal over a communication channel between the first terminal and a second terminal, within a first time period, each reference signal being received at a corresponding interval within the first time period; transmit a responsive signal from the first terminal to the second terminal, the responsive signal being transmitted when a channel condition estimation of the communication channel exceeds a channel condition threshold, the responsive signal being indicative of the user terminal being ready for a data transmission.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
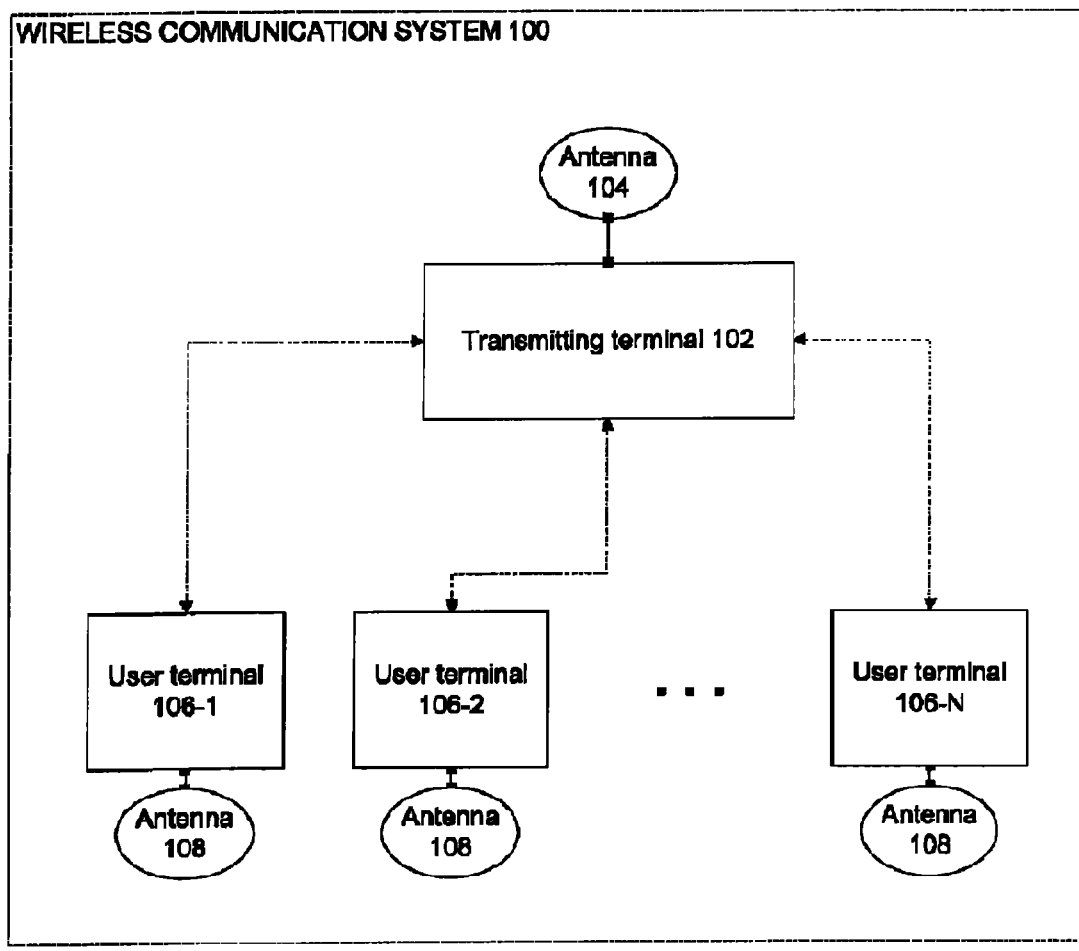
FIG. 1 is a block diagram of a wireless communication system consistent with disclosed embodiments.

FIG. 1 illustrates a block diagram of a wireless communication system 100 consistent with disclosed embodiments. In one embodiment, the system 100 may include a transmitting terminal 102 having one or more antennas, such as antenna 104, and a number of user terminals 106-1, 106-2, . . . , and 106-N (N is the total number of user terminals in the system 100). Each of the user terminals 106-1 to 106-N may have at least one antenna 108. In some systems or devices, the antenna may be embedded or hidden within the systems or devices. The terminals illustrated may be at a system level, a user level, or one of the intermediate levels between the system level and the user level. For example, the transmitting terminal 102 may be a base station, a relay station, or an access point, and each of the user terminals 106-1, . . . , 106-N may be a mobile station or a fixed station, such as a cell phone, a smart phone, a processing device, a computer, or a communication device.

Figure 2:
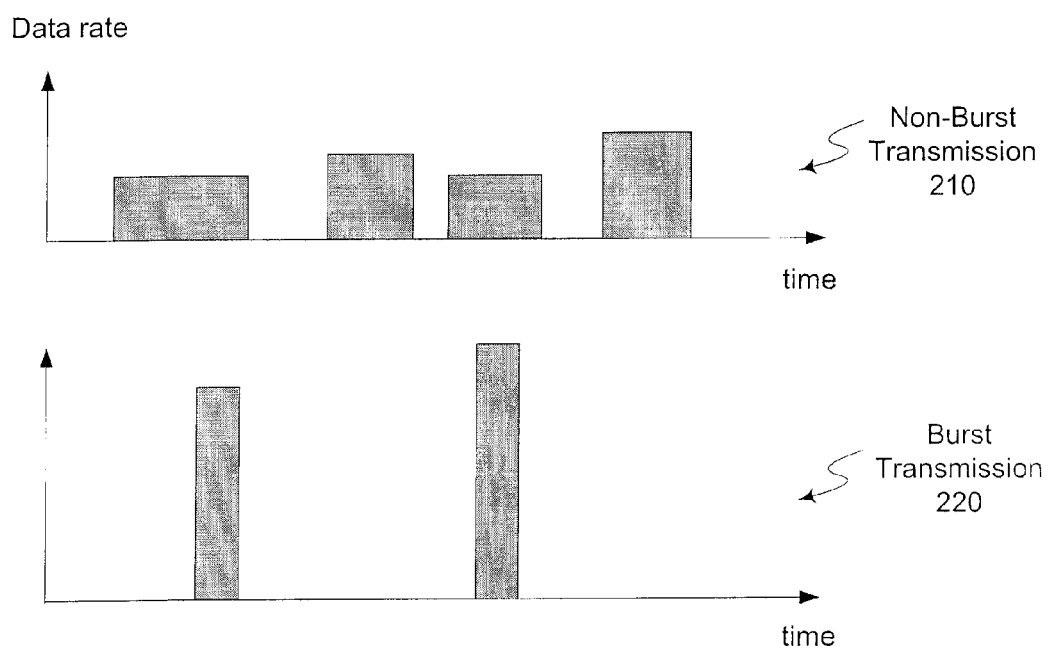
FIG. 2 is a comparative graphical representation of possible data transmissions in an exemplary non-burst mode and an exemplary burst mode consistent with disclosed embodiments.

FIG. 2 illustrates an exemplary graphical representation of data transmission in an exemplary non-burst mode 210 and an exemplary burst mode 220. As shown, the rate of data transmission in non-burst mode 210 may be lower than the rate of data transmission in burst mode 220. Additionally, as shown, the period of time during which data is transmitted may be longer in non-burst mode 210 (or spread out across several time periods) than in burst mode 220. In an exemplary embodiment, burst mode 220 may use wireless resources more efficiently than non-burst mode 210. Depending on the applications or designs, one possible improvement in efficiency may include providing power savings by allowing a user terminal to sleep (or enter into a reduced power mode) for a longer period of time. Time savings may be achieved by transmitting the same or similar amount of data in a shorter period of time. As another example, efficiency in data transmission may improve because data with a moderate to high delay tolerance (or low priority) may be transmitted during a period of time when the channel conditions allow for an increased data rate, leaving time for other data transmissions. In some embodiments, burst mode may be used to transmit non-real-time data traffic with a moderate delay tolerance.

Figure 3:
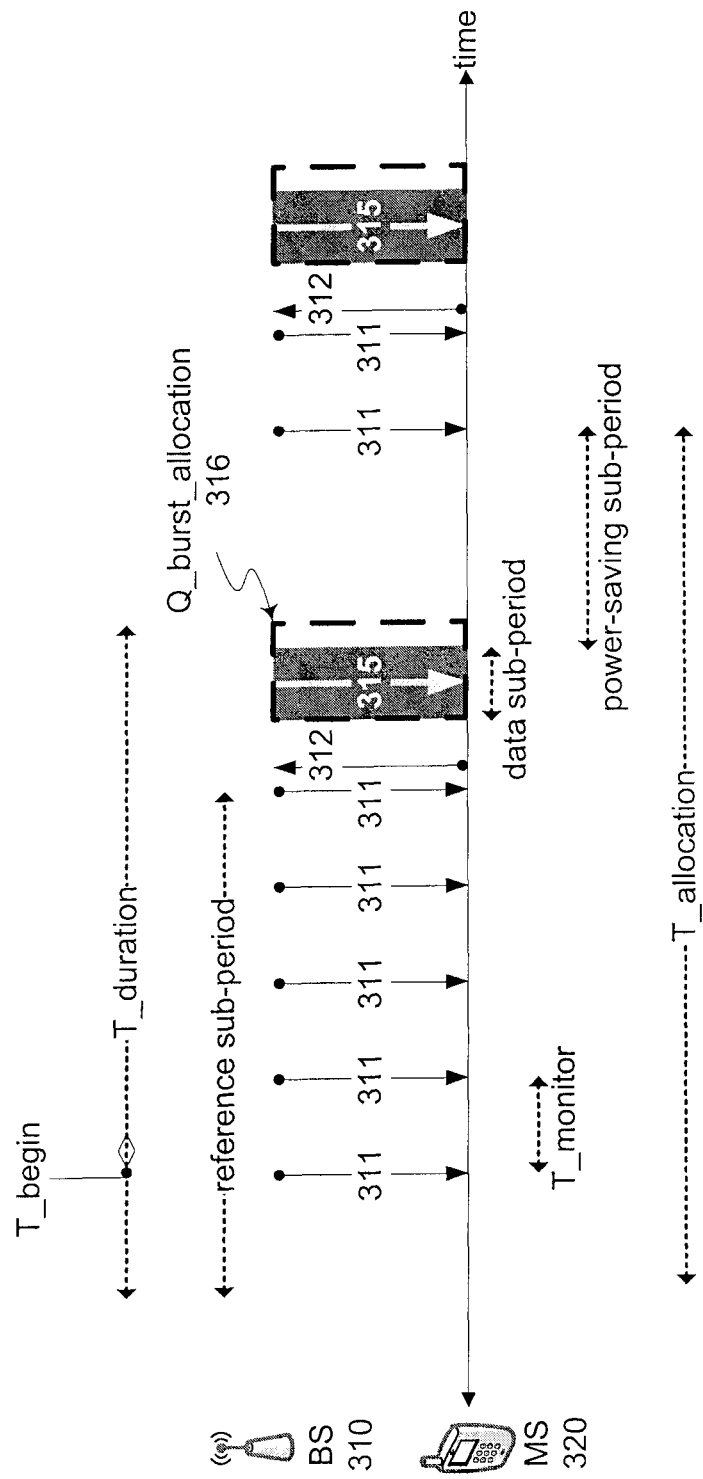
FIG. 3 illustrates an example of downlink signaling and data transmission diagrams consistent with disclosed embodiments.

FIG. 3 illustrates an example of downlink signaling and data transmission diagram consistent with disclosed embodiments. FIG. 3 illustrates signals between a transmitting terminal, here a base station (BS) 310, and a user terminal, here a mobile station (MS) 320, both of which may operate in a burst mode, such as burst mode 220 illustrated in FIG. 2. As shown in FIG. 3, the BS 310 may send one or more reference signals 311, which may be provided at a predetermined, periodic interval, labeled T_monitor. T_monitor may be measured in any unit of time, including frequency, and may be selected by the BS 310, the MS 320, by negotiation between both the BS 310 and MS 320, or based on system designs or communication protocols. T_monitor may be a fixed interval, or it may vary over time or based on other factors, such as channel quality, the terminals in communication, or the type of data communication.

Reference signals 311 may be transmitted during a maximum reference sub-period, labeled T_duration, or until the signal 312 is sent. All or part of the period, T_duration, may be a sub-period of the period labeled T_allocation. The actual period during which the BS 310 is transmitting reference signals 311 and during which time the MS 320 is considering reference signals 310 is a reference sub-period within both T_duration and T_allocation. The reference sub-period may or may not also include the period of T_duration preceding T_begin. In some embodiments, T_allocation may be a maximum amount of time, or other scheduling metric, during which the channel may be probed by the MS 320.

For each reference signal 311, the mobile station may evaluate the channel condition based on the corresponding reference signal. If the channel condition does not exceed a certain threshold (Th_feedback), then the MS 320 does not respond to the reference signal 311. The MS 320 not responding may indicate that the channel condition is below the Th_feedback.

If the channel condition is above Th_feedback, MS 320 may respond with a signal 312. The signal 312 may indicate to the BS 310 that the channel condition is good enough to begin burst data transmission to the MS 320. The signal 312 may further include a measure of the channel condition to inform the BS 310 of the estimated channel condition. In response to the signal 312, the BS 310 may then send a downlink data burst 315.

In some exemplary embodiments, the downlink data burst 315 may continue for a maximum duration, Q_burst_allocation 316. The downlink data burst 315 may span all or part of Q_burst_allocation 316. All or a portion of the transmission of the downlink data burst 315 may span a sub-period within T_allocation, also referred to as a data sub-period. The Q_burst_allocation 316 may be a fixed period of time, or may be based on a certain volume of data transmitted, or other scheduling metric, or whichever condition is met first. For example, in one exemplary embodiment, Q_burst_allocation may be an estimate of the amount of time required to transmit a certain quantity of data in burst mode at an estimated, specified, or projected transmission rate. Alternatively, Q_burst_allocation may be dynamically allocated, and/or based on channel conditions, quality of service guarantees, quantity of data, and/or the type of data being transmitted. These and other methods of determining, specifying, and/or measuring Q_burst_allocation 316 are within the scope of the disclosure. The parameters of the burst mode transmission may be configured by the BS 310. All or a portion of Q_burst_allocation 316 may also be a sub-period within the T_duration period. In other embodiments, Q_burst_allocation 316 may not overlap with the T_duration period.

The value of Th_feedback, T_allocation, Q_burst_allocation 316, and T_duration may be fixed, or may be dynamically set, or may be negotiated, within or between T_allocation periods, based on, but not limited to, the state of the channel, the terminals in communication, the type of data communication, system designs or communication protocols, the priority of the data, the priority of the MS 320, the QoS guarantee, the network load, the targeted modulation and coding scheme (MCS), the channel condition, the radio resource management (RRM) schemes and/or the power saving requirement of the MS 320.

QoS mode may be implemented separately or integrated with burst mode. QoS mode may arise if a periodic or semi-periodic guarantee is desired. In these embodiments, the QoS mode may constrain the BS 310 to schedule a certain amount of transmission opportunity during the T_allocation period. In some embodiments, the QoS guarantee may be facilitated by dynamically adjusting the Th_feedback value. Additionally, setting different values for the T_allocation and/or T_duration parameters may also serve to differentiate levels of QoS service requirements.

In an exemplary embodiment, if the priority for data transmission is to conserve power consumption, the MS 320 may be assigned a comparatively shorter T_duration and a longer T_allocation. In some cases, the downlink data burst 315 may not be guaranteed during each T_allocation period. For example, the channel condition may never exceed Th_feedback during the T_allocation period.

In another exemplary embodiment, if the priority for data transmission is to realize a QoS guarantee, the Th_feedback may be dynamic and adjusted in order to achieve the QoS guarantee. Multiple mobile stations may have a different value as the Th_feedback, as well as having different other parameters in burst mode.

In yet another embodiment, the BS 310 may not need to send reference signals 311. For example, the channel may be specifically allocated to a higher-order node for data transmission. Examples in which this embodiment may be implemented include, but are not limited to, multimedia streaming and real-time data. While the T_allocation, T_duration, and/or reference signals 311 may not be required in some embodiments, the MS 320 may still measure the channel condition and compare it to a Th_feedback and cause the BS to stop transmitting if the channel condition falls below the Th_feedback.

In still another embodiment, the wireless communication system may use MS grouping. MS grouping involves dividing the MSs being served by the BS into several groups and setting a start time for each group at which the MSs in that group should begin to monitor reference signals, labeled as T_begin. By staggering the T_begin times for each group, the MSs served by the BS may be activated alternately, which may reduce power consumption, and the probability that an MS in a group receives a data burst after sending its response signal 312 may increase because it may be competing with fewer MSs.

In another exemplary embodiment, as shown in FIG. 3, after the MS 320 receives the downlink data burst 315 during the first T_allocation period, the MS 320 may enter power-saving mode and the BS 310 may stop sending reference signals 311 until the next T_allocation period. Alternately, the MS 320 may give reduced consideration to reference signals sent after the downlink burst 315 as compared to the consideration before the downlink burst 315. Power-saving mode may operate in various additional ways, including but not limited to, the MS 320 not monitoring the wireless channel condition, the MS 320 not estimating the channel condition, the MS 320 not sending a response signal 312, and/or an MS not receiving or transmitting data packets. The MS 320 may remain in power-saving mode for the remainder of the T_allocation period during which the downlink data burst 315 was received, as labeled in FIG. 3 as the power-saving sub-period, where the power-saving sub-period is within the T_allocation period. In still other embodiments, power-saving mode may continue for one or more T_allocation periods thereafter.

Additionally, a signaling mechanism similar to the downlink transmission embodiments disclosed herein may be implemented for uplink data transmission. In these embodiments, a reference signal similar to the reference signal 311 is transmitted from the MS 320 to the BS 310. In some embodiments, the MS 320 may consider estimated channel conditions based on reference signals previously transmitted during the downlink mechanism. This channel condition history may improve transmission efficiency, especially if the downlink and uplink channel conditions are positively correlated. The BS 310 may transmit a responsive signal similar to the responsive signal 312, indicating that the MS 320 may transmit data. The mechanism for transmission may be selected from the set including but not limited to random access, MS-specific CDMA code, and BS centralized allocation. After receiving the responsive signal, the MS may begin an uplink data transmission similar to the downlink data transmission 315. Subsequent to the uplink data transmission, the MS 310 may enter power-saving mode. It is understood by those skilled in the art that other aspects of the downlink transmission embodiments may apply and be extended to the uplink data transmission implementation, including, but not limited to, using MS grouping, using timing offset, and reducing the signaling cost for channel condition monitoring.

Figure 4:
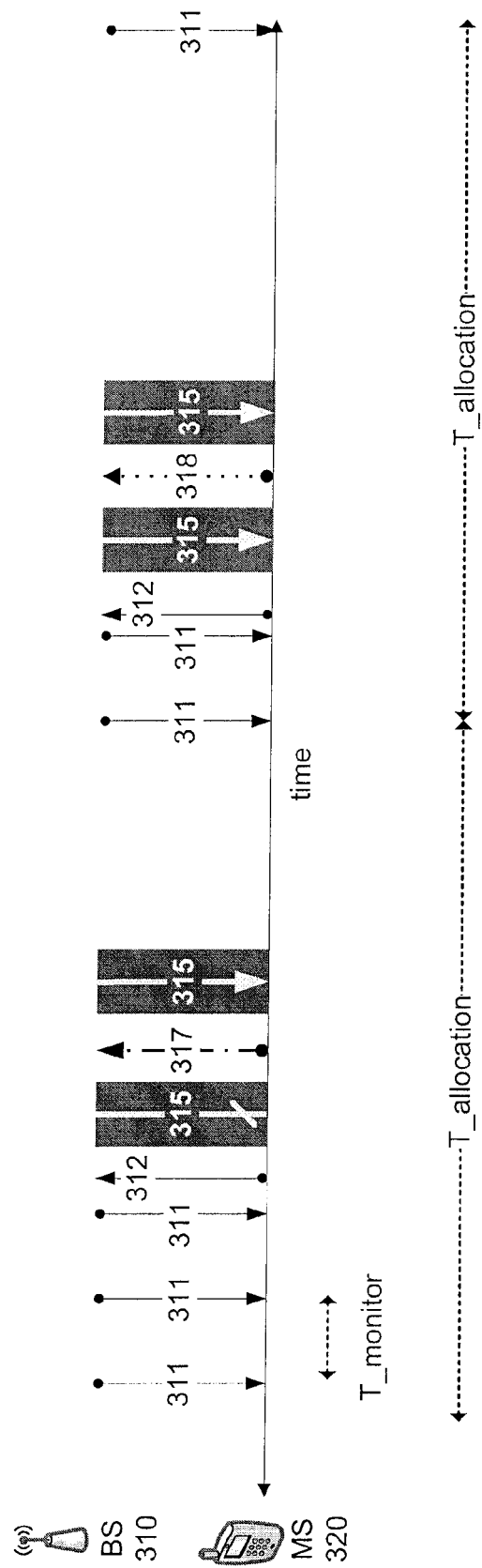
FIG. 4 illustrates another example of downlink signaling and data transmission diagrams consistent with disclosed embodiments.

FIG. 4 illustrates another example of a downlink signaling and data transmission diagram. As in FIG. 3, FIG. 4 illustrates signals between the BS 310 and the MS 320. Here, however, the downlink data burst 315 may not be received correctly. As shown, the MS 320 may report a negative acknowledgement (NACK) signaling message 317 to signal that a data burst error has occurred. The NACK signaling message 317 may include the channel condition or an indication as to whether the channel condition exceeds the Th_feedback. As shown, after receiving the NACK signaling message 317, the BS 310 may re-transmit the downlink data burst 315. Alternately, and depending on various conditions, the BS 310 may decide not to re-transmit the downlink data burst 315 until the next or later T_allocation period.

FIG. 4 further illustrates signals between the BS 310 and the MS 320 where the MS 320 may report an acknowledgement (ACK) signaling message 318 to signal that a data burst was received correctly. The ACK signaling message 318 may include an option to indicate that the MS intends to receive an additional data burst. In some cases, the BS 310 may send an additional data burst to the MS 320 after receiving the ACK signaling message 318. In an exemplary embodiment, the decision to send an additional data burst may be constrained by a number of factors, including but not limited to, T_duration, Q_burst_allocation, T_allocation, and T_monitor. Additionally, the BS 310 may ignore any constraints and send an additional data burst based on any number of factors disclosed herein.

The ACK and/or NACK mechanism may improve the robustness of the data transmission. In an exemplary embodiment, the base station 310 may provide for an ACK and/or NACK transmission immediately after the downlink data burst 315. In another exemplary embodiment, the base station 310 may provide for an ACK and/or NACK transmission only when an error in the data burst transmission 315 occurs. This may be implemented to reduce the latency and conserve bandwidth for data transmission.

In these and other embodiments, burst mode and/or QoS mode may be integrated with each other and/or an error-control method, including, but not limited to, automatic repeat request (ARQ), and hybrid automatic repeat request (HARQ). Alternately, non-burst mode may be integrated with the signaling mechanisms described herein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless communication method comprising:
    establishing a communication channel between a first terminal and a second terminal, the communication channel being configured to provide wireless communications of more than two terminals;
    transmitting over the communication channel one or more reference signals from the first terminal to the second terminal within a first time period, each of the one or more reference signals being transmitted at an interval occurring periodically within the first time period and being configured to allow evaluation of a channel condition of the communication channel;
    receiving a responsive signal from the second terminal, the responsive signal being transmitted when a channel condition estimation of the communication channel exceeds a channel condition threshold, the responsive signal being indicative of the second terminal being ready for a data transmission;
    allocating a second time period within the first time period for transmission of at least one data packet from the first terminal to the second terminal based on the responsive signal;
    transmitting the at least one data packet from the first terminal to the second terminal within the second time period; and
    allowing the second terminal to enter into an operation mode limiting the second terminal's ability to receive or transmit for a power-saving time period within the first time period, wherein the power-saving time period overlaps with the second time period when the transmission of at least one data packet completes or terminates before the end of the second time period.

2. The method of claim 1, wherein the responsive signal includes information regarding the channel condition estimation.

3. The method of claim 1, the at least one data packet being transmitted via a burst mode, wherein the burst mode provides an increased rate of data transmission as compared to a non-burst mode transmission.

4. The method of claim 1, wherein the at least one data packet is transmitted via a quality of service (QoS) mode, the QoS mode providing a periodic or semi-periodic QoS guarantee, wherein the guarantee is an allocation of transmission opportunity within the first time period.

5. The method of claim 1, wherein the second time period has a duration that is allocated based on a quantity of data to be transmitted.

6. The method of claim 1, wherein during the second time period, the second terminal gives reduced consideration to reference signals as compared to the consideration given during the period of time preceding the responsive signal.

7. The method of claim 1, wherein the transmitting over the communication channel the one or more reference signals from the first terminal to the second terminal occurs within a reference sub-period within the first time period.

8. The method of claim 1, wherein the first terminal is a transmitting terminal, the second terminal is a user terminal, and the data transmission is a downlink data transmission.

9. The method of claim 8, wherein the transmitting terminal serves at least two user terminals and wherein the transmitting terminal groups the at least two user terminals into at least two sets, each of the at least two sets comprising a subset of the at least two user terminals and at least one user terminal, and wherein the transmitting terminal activates each of the at least two sets alternately, such that within the first time period, at least one of the user terminals is operating in a mode limiting the at least one of the user terminal's ability to receive or transmit for a power-saving sub-period within the first time period.

10. The method of claim 9, wherein the transmitting terminal activates each of the at least two sets alternately by delaying for an offset sub-period within the first time period, the start of the transmitting over the communication channel the one or more reference signals from the first terminal to the second terminal within the first time period.

11. A non-transitory computer-readable medium including instructions for performing a method, when executed by a processor handling data transmission in a wireless communication network, the method comprising:
    establishing a communication channel between a first terminal and a second terminal, the communication channel being configured to provide wireless communications of more than two terminals;
    transmitting over the communication channel one or more reference signals from the first terminal to the second terminal within a reference sub-period within a first time period, each of the one or more reference signals being transmitted at a corresponding interval occurring periodically within the first time period and being configured to allow evaluation of a channel condition of the communication channel;
    receiving a responsive signal from the second terminal, the responsive signal being transmitted when a channel condition estimation of the communication channel exceeds a channel condition threshold, the responsive signal being indicative of the second terminal being ready for a data transmission;
    allocating a second time period within the first time period for transmission of at least one data packet from the first terminal to the second terminal based on the responsive signal;

transmitting, within the second time period, the at least one data packet from the first terminal to the second terminal via a burst mode, wherein the burst mode provides an increased rate of data transmission as compared to a non-burst mode, and wherein at least some of the reference sub-period precedes the second time period; and allowing the second terminal to enter into an operation mode limiting the second terminal's ability to receive or transmit for a power-saving time period within the first time period, wherein the power-saving time period overlaps with the second time period when the transmission of the at least one data packet completes or terminates before the end of the second time period.

12. A wireless communication method comprising:

monitoring a communication channel between a first terminal and a second terminal, the communication channel being configured to provide wireless communications of more than two terminals;

receiving over the communication channel one or more reference signals from the first terminal to the second terminal within a first time period, each of the one or more reference signals being transmitted at a corresponding interval occurring periodically within the first time period and being configured to allow evaluation of a channel condition of the communication channel;

transmitting a responsive signal from the second terminal, the responsive signal being transmitted when a channel condition estimation of the communication channel exceeds a channel-condition threshold, the responsive signal being indicative of the second terminal being ready for a data transmission;

allocating a second time period within the first time period for transmission of at least one data packet from the first terminal to the second terminal based on the responsive signal;

receiving, at the second terminal, the at least one data packet from the first terminal within the second time period; and entering into an operation mode limiting ability to receive or transmit for a power-saving time period within the first time period, wherein the power-saving time period overlaps with the second time period when the transmission of the at least one data packet completes or terminates before the end of the second time period.

13. The method of claim 12, wherein the responsive signal includes information regarding the channel condition estimation.

14. The method of claim 12, wherein the at least one data packet is transmitted via a burst mode, wherein the burst mode provides an increased rate of data transmission as compared to a non-burst mode transmission.

15. The method of claim 12, wherein the at least one data packet is transmitted via a quality of service (QoS) mode, the QoS mode providing a periodic or semi-periodic QoS guarantee, wherein the guarantee is an amount of transmission opportunity within the first time period.

16. The method of claim 12, wherein the second time period has a duration that is allocated based on a quantity of data to be received.

17. The method of claim 12, further comprising reducing the cosideration given to reference signals during the second time period as compared to the consideration given during the period of time preceding the responsive signal.

18. The method of claim 12, wherein the receiving over the communication channel the one or more reference signals from the first terminal to the second terminal occurs within a reference sub-period within the first time period.

19. The method of claim 18, further comprising receiving, within the second time period, the at least one data packet from the first terminal to the second terminal via a burst mode, wherein the burst mode provides an increased rate of data transmission as compared to a non-burst mode, and wherein at least some of the reference sub-period precedes the second time period.

20. The method of claim 19, wherein the first terminal is a transmitting terminal, the second terminal is a user terminal, and the data transmission is a downlink data transmission.

21. The method of claim 20, wherein the transmitting terminal serves at least two user terminals and wherein the transmitting terminal groups the at least two user terminals into at least two sets, each of the at least two sets comprising a subset of the at least two user terminals and at least one user terminal, and wherein the transmitting terminal activates each of the at least two sets alternately, such that within the first time period, at least one of the user terminals is operating in a mode limiting the at least one of the user terminal's ability to receive or transmit for a power-saving time period within the first time period.

22. The method of claim 21, wherein the transmitting terminal activates each of the at least two sets alternately by delaying for an offset sub-period within the first time period, the start of the transmitting over the communication channel one or more reference signals from the first terminal to the second terminal within the first time period.

23. A wireless communication system comprising a first terminal, configured to:

receive one or more reference signals over a communication channel between the first terminal and a second terminal within a reference sub-period within a first time period, each of the one or more reference signals being received at a corresponding interval occurring periodically within the first time period;

transmit a responsive signal from the first terminal to the second terminal, the responsive signal being transmitted when a channel condition estimation of the communication channel exceeds a channel condition threshold, the responsive signal being indicative of the user terminal being ready for a data transmission;

receive, within a second time period allocated within the first time period by the first terminal for transmission of at least one data packet, the at least one data packet at the second terminal via a burst mode, wherein the burst mode provides an increased rate of data transmission as compared to a non-burst mode, wherein at least some of the reference sub-period precedes the second time period, and wherein the second time period is allocated based on the responsive signal; and enter into an operation mode limiting the first terminal's ability to receive or transmit for a power-saving time period within the first time period, wherein the power-saving time period over laps with the second time period when the transmission of the at least one data packet completes or terminates before the end of the second time period.

24. The system of claim 23, wherein the first terminal is a transmitting terminal and the second terminal is a user terminal.

* * * * *